US005177853A

United States Patent [19]

Herook

[11] Patent Number: 5,177,853

[45] Date of Patent: Jan. 12, 1993

[54] GARBAGE DISPOSAL FLANGE ASSEMBLY TOOL

[76] Inventor: John T. Herook, 258 Farrwood Dr., Bradford, Mass. 01835

[21] Appl. No.: 871,018

[22] Filed: Apr. 20, 1992

[51] Int. Cl.[5] .............................................. B23P 19/04

[52] U.S. Cl. .................................................... 29/266

[58] Field of Search .................. 254/100, 131; 29/266, 29/263, 259, 260; 269/49

[56] References Cited

U.S. PATENT DOCUMENTS

| | | | |
|---|---|---|---|
| 1,481,061 | 1/1924 | Hunter | 29/266 |
| 2,746,062 | 5/1956 | Waltz | 269/49 |
| 3,270,407 | 9/1966 | Aravjo | 254/100 |
| 4,175,734 | 11/1979 | Williams | 269/49 |
| 4,175,735 | 11/1979 | Griffin | 269/49 |

FOREIGN PATENT DOCUMENTS

| | | | |
|---|---|---|---|
| 494711 | 10/1938 | United Kingdom | 29/266 |

*Primary Examiner*—Robert C. Watson
*Attorney, Agent, or Firm*—William Nitkin

[57] ABSTRACT

A tool for the installation of a sink flange and garbage disposal mounting flange assembly in the drain opening of a sink, such tool including a generally U-shaped member with the tops of each side thereof extending outward, a shaft member affixed to a central portion of the U-shaped member extending between the sides thereof, such shaft receiving the mounting flange assembly and having a threaded portion passed through the drain opening in the sink in which is positioned the sink flange and on which shaft is positioned a retention member, such shaft passing through an aperture centrally defined in such retention member with a handle member having a threaded engagement aperture to be screwed down on the shaft to retain the sink flange and garbage disposal mounting flange structure in place during installation thereof.

1 Claim, 1 Drawing Sheet

GARBAGE DISPOSAL FLANGE ASSEMBLY TOOL

BACKGROUND OF THE INVENTION

1. Field of the Invention

The device of this invention resides in the area of tools to assist in the installation of a garbage disposal mounting flange and more particularly relates to a tool which holds the sink flange above, and retains the mounting elements for, a garbage disposal below a sink drain opening for fast and easy alignment and attachment thereof.

2. Description of the Prior Art

When one is installing a garbage disposal, one must first install the garbage disposal mounting assembly which includes a fiber gasket positioned immediately below the sink on the sink flange, a back-up ring positioned beneath the fiber gasket, a mounting ring with three mounting screws therein beneath the back-up ring, and a snap ring to retain the mounting ring at the base of the sink flange. One must first align and putty under the sink flange rim and place its sleeve base through the sink drain opening in the sink and compress the rim against the sink to force out the excess putty. Then under the sink one must then hold the fiber gasket, back-up ring and mounting ring with its three screws therein and manipulate these elements onto the base of the sink flange without disturbing the positioning of the sink flange in order to be able to install the snap ring around the grooved base of the sleeve of the sink flange. The snap ring is a very tight fit and must be pried open and forced on carefully as it is in a hard-to-reach position under the sink while at the same time one must hold the sink flange rim in place. Then one must tighten the mounting screws upward against the bottom of the back-up ring, tightening it and the fiber gasket against the bottom of the sink to hold the disposal mounting flange and attached sink flange assembly in place. This is a difficult procedure and often much time is spent manipulating and properly aligning these items. If the putty under the sink flange rim is squeezed too much on one side or another, it can cause putty to ooze out on one side, requiring that the process be started over otherwise an inadequate seal will result if there is not a uniform and sufficient amount of putty in place under the sink flange rim. Also if not aligned correctly, the sink flange can be installed off-center in the sink drain opening. If the sink flange leaks after the installation has been completed, the entire assembly must be dismantled and the installation process started over again.

SUMMARY OF THE INVENTION

It is an object of this invention to provide a garbage disposal flange mounting assembly tool to enable one to quickly, easily and properly assemble and install a sink flange and mounting rings for the installation of a garbage disposal.

The device of this invention comprises first a substantially U-shaped member having the tops of its upwardly extending arms curved outward a distance of approximately 1 inch with the bottom center portion of the U-shaped member attached to an upwardly extending, threaded shaft. The shaft member can have a stop member positioned thereon, and a retention member is adapted to pass down the shaft. A handle member which is generally T-shaped having a threaded opening within its vertical portion is screwed downward onto the threaded shaft to tighten against the retention member.

In practice one takes the device of this invention with the handle and retention member removed and drops the mounting ring, the back-up ring and the fiber gasket, in that order, onto the shaft of the U-shaped member. The three mounting screws can be screwed into position for later tightening in the mounting ring. One then can place putty under the rim of the sink flange and position it in the drain opening of the sink. With the U-shaped member under the drain opening of the sink and its shaft extending through the drain opening of the sink, the retention member is passed down the shaft onto the sink flange. The handle member is tightened down onto the retention member. As a consequence of the tightening of the handle member against the retention member, the outwardly extending upper arms of the U-shaped member are pulled upward against the bottom of the sink and the sink flange is forced down into the sink drain opening, forcing putty out from under its rim. The fiber gasket, back-up ring and mounting ring are then positioned immediately below the sink flange in a position so that the mounting ring can be lifted and the snap ring can then be pried open and snapped into the groove that is formed around the base of the sleeve of the sink flange. As one tightens the handle member down the threaded portion of the shaft, until striking the retention member which covers the upper outwardly extending rim portion of the sink flange, the tightening action holds the tool and sink flange tightly in place. A smaller, round projection of the retention member having a diameter of slightly smaller size than the inside diameter of the sink flange fits into the sink flange and helps retain the tool's shaft centrally aligned so that the shaft is centered and the top of the retention member is directly above the sink flange. Once the tool of this invention is tightened in place, holding the sink flange securely in place in its proper positioning, one then can easily pry open the snap ring for positioning on the groove on the sink flange sleeve which positioning will then retain the mounting rings thereabove in place without danger of dislodging or misaligning the sink flange in the drain opening of the sink. One then tightens the three screws in the mounting plate so that they tighten sufficiently against the bottom of the back-up ring to hold the sink flange and the garbage disposal support assembly tightly in place. One can then remove the T-shaped handle by unscrewing it and lift the retention member from its positioning on top of the sink flange. The U-shaped member can then be removed from the bottom of the assembly.

Once the sink flange and attached mounting assembly are installed, the the garbage disposal unit can be engaged with it and rotated to be locked in position. The sink flange, fiber gasket, back-up ring and mounting ring must be properly aligned and efficiently and quickly installed otherwise valuable time is lost and if they are improperly installed, then a leaky sink and an off-center garbage disposal will be the result.

DESCRIPTION OF THE PREFERRED EMBODIMENT(S)

Figure 1:
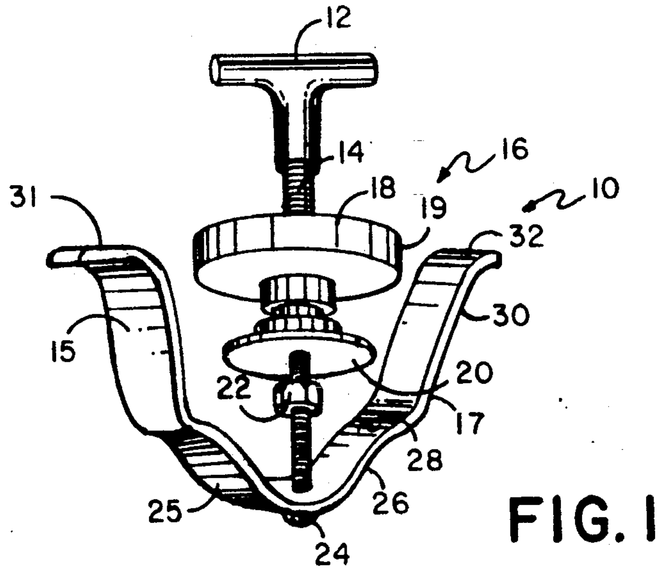
FIG. 1 illustrates a perspective view of the tool of this invention with the retention member thereon and the handle in position.
Figure 2:
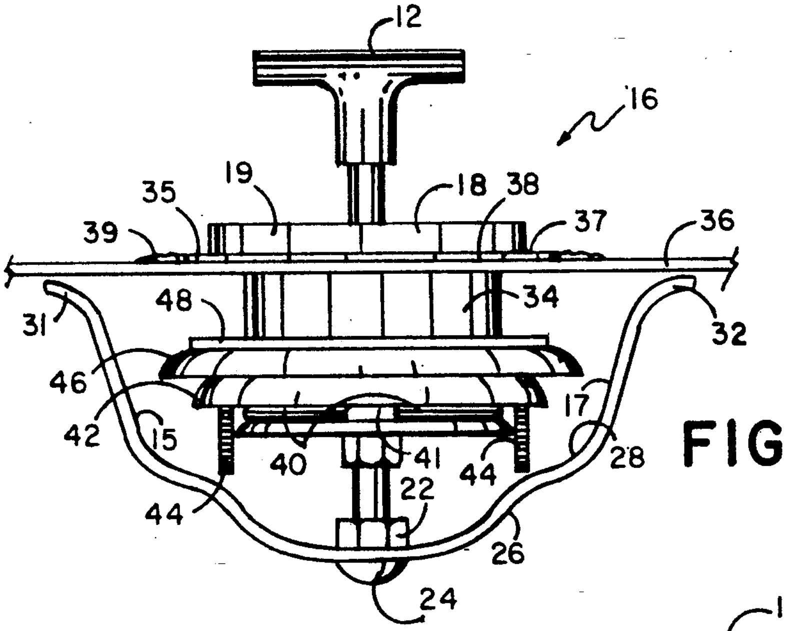
FIG. 2 illustrates a cross-sectional view of the structure of this invention mounted on a sink with the sink flange in place and the fiber gasket, back-up ring and mounting ring in place.

FIG. 1 illustrates a perspective view of the garbage disposal flange assembly tool 16 of this invention and showing the parts thereof. FIG. 2 illustrates the tool during installation of the garbage disposal mounting assembly. In FIG. 2 the bottom of sink 36 is seen with the base of sink flange 35 passing therethrough with rim 37 of sink flange 35 resting on top of sink 36 with putty 39 extending out therefrom which excess putty is later cleaned up. Resting on rim 37 of sink flange 35 is retention member 18 which has top member 19 adapted to fit on top of sink flange rim 37. Stop member 22 on shaft 14, which stop member 22 can be a nut, prevents retention member 18 from passing too far down shaft 14. In use T-shaped handle 12 and retention member 18 are removed from shaft 14, and mounting ring 42, back-up ring 46, and fiber gasket 48 are positioned on shaft 14 above U-shaped member 28 and screws 44 are screwed into mounting ring 42. U-shaped member 28 has outwardly extending first and second upper arms 31 and 32 which are pulled up against the bottom of sink 36 and tightened against sink 36 by the pressure of the tightening action of handle 12 on retention member 18 thereby pulling up shaft 14. At this time snap ring 40 is snapped onto groove 41 on the base of sleeve 34 of sink flange 35.

As seen in FIG. 2, U-shaped member 28 has first and second curvatures 25 and 26 progressing upward from its its bottom which then extend outward laterally, then vertically at first and second rising sides 15 and 17 upwards to outwardly extending first and second upper arms 31 and 32 which arms rest against the bottom of sink 36 after tightening by T-shaped handle 12 which U-shaped member 28 allows sufficient room for the receipt and manipulation of the mounting ring parts and snap ring 40 into groove 41 at the base of sleeve 34 of sink flange 35 and the subsequent tightening of the mounting screws.

By using the tool of this invention, a proper seating of the sink flange occurs with a good waterproof seal between sink 36 and sink flange 35. Once the flange assembly is mounted, it is easy to attach the garbage disposal unit because it merely engages into the mounting assembly with a twist-lock motion.

Figure 3:
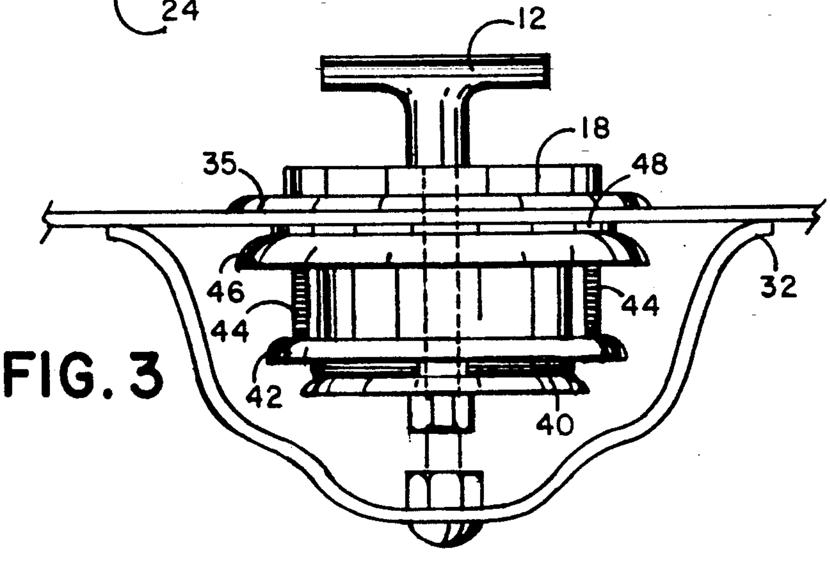
FIG. 3 illustrates a cross-sectional view of the structure of FIG. 2 with mounting screws tightened.

With reference made to FIG. 2, U-shaped member 28 can be formed from a bar of 12-gauge steel or equivalent strong material that is approximately 1 inch wide with a curved bottom and vertically disposed first and second rising sides 15 and 17 with 1-inch long first and second upper arms 31 and 32. Shaft 14 can be 7 inches long and made of a $\frac{3}{8}$ inch diameter material such as metal which is threaded. Shaft 14 can be a long bolt passed through an aperture in the center of the bottom of the U-shaped member aimed upwards and held in place by a nut. The T-shaped handle is internally threaded on the downwardly extending portion of the T so that it will screw easily onto the threaded portion of shaft 14. The base of the internally threaded portion of handle 12 can be indented to easily align it with the threads of shaft 14. Retention member 18 guide can be made from $\frac{1}{2}$-inch steel, and its top can be approximately 4 inches in diameter with an aperture in the center thereof to fit somewhat loosely onto shaft 14 during use of the tool to leave room for play sometimes required if the bottom of the sink is irregular in shape. Projection member 20 can be $2\frac{1}{2}$ inches in diameter spaced downward 1 inch from retention member top 19 so as to be able to fit within the sink flange sleeve. All steel parts can be zinc-plated or otherwise coated to prevent rusting. The tool of this invention can be used with sinks of all thicknesses having curved or flat bases. It can also be utilized with sinks made of metal, ceramic or plastic materials FIG. 3 illustrates a cross-sectional view of the structure of FIG. 2 showing mounting screws 44 tightened against back-up ring 46.

Although the present invention has been described with reference to particular embodiments, it will be apparent to those skilled in the art that variations and modifications can be substituted therefor without departing from the principles and spirit of the invention.

I claim:

1. A tool for the installation on a sink, having a drain opening, of the mounting flange assembly for a garbage disposal unit on the sleeve of a sink flange, such mounting flange assembly being of the type including a gasket, a back-up ring and a mounting ring held by a snap ring when said snap ring is installed in a groove defined in the base of said sink flange, said sink flange having a sink flange rim dispossed above the drain opening of said sink, with said sleeve of said sink flange extending through said drain opening, comprising:

a generally U-shaped member having a bottom portion and two generally vertical sides with the tops of each vertical side extending outward approximately 90 degrees therefrom;

a shaft member having a diameter positioned and affixed perpendicularly to a central portion of said bottom portion of said U-shaped member, said shaft member extending upwardly therefrom parallel to and between said vertical sides having at least its upper portion threaded;

a retention member having a width and an aperture centrally disposed therein, said aperture having a diameter larger than the diameter of said shaft member, the width of said retention member being approximately as wide as the width of said sink flange rim, said retention member positionable with said shaft passing through said aperture after the gasket, back-up ring and mounting ring has been positioned on said shaft member and said shaft member has been passed from under said sink through said sink flange sleeve in said drain opening;

a round projection member disposed on said retention member, said projection member adapted to fit within said sink flange to center and align said shaft member within said sink flange to align said retention member on said sink flange rim; and a handle member having a threaded engagement aperture defined therein adapted to be screwed down on said threaded shaft member until said handle member contacts said retention member and pulls said U-shaped member upward until said U-shaped member contacts said sink, forcing said sink flange into position in said sink for the holding of said sink flange and mounting flange assembly to allow for the positioning of said snap ring into said groove in said sink flange.

* * * * *